US012753042B2

(12) United States Patent
Glessner

(10) Patent No.: US 12,753,042 B2
(45) Date of Patent: Oct. 6, 2026

(54) CONVEYANCE SYSTEM WITH REGENERATIVE DRIVE

(71) Applicant: Otis Elevator Company, Farmington, CT (US)

(72) Inventor: Stephan Glessner, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 990 days.

(21) Appl. No.: 17/984,811

(22) Filed: Nov. 10, 2022

(65) Prior Publication Data

US 2024/0051787 A1 Feb. 15, 2024

(30) Foreign Application Priority Data

Aug. 15, 2022 (EP) .................................... 22190435

(51) Int. Cl.
*B66B 1/34* (2006.01)
*B65G 23/23* (2006.01)
(Continued)

(52) U.S. Cl.
CPC .............. *B66B 1/302* (2013.01); *B65G 23/23* (2013.01); *B66B 1/308* (2013.01); *H02P 3/14* (2013.01); *B65G 2812/02148* (2013.01)

(58) Field of Classification Search
CPC ........... B66B 1/302; B66B 1/308; H02P 3/14; B65G 23/23
(Continued)

(56) References Cited

U.S. PATENT DOCUMENTS

2007/0170910 A1* 7/2007 Chang .................... H01G 7/026 333/172
2010/0044160 A1* 2/2010 Agirman ................. B66B 1/302 187/290
(Continued)

FOREIGN PATENT DOCUMENTS

WO 9825849 A1 6/1998

OTHER PUBLICATIONS

European Search Report for application EP 22190435.2, dated Jan. 24, 2023, 122 pages.
(Continued)

*Primary Examiner* — Erick D Glass
(74) *Attorney, Agent, or Firm* — CANTOR COLBURN LLP

(57) ABSTRACT

A conveyance system includes an alternating current (AC) power source (28), a machine (30) for moving a conveyance apparatus, and a regenerative drive (20). The machine is connected to the AC power source by the regenerative drive. The regenerative drive includes a direct current (DC) bus (26), a converter (22) and a machine control circuit (24). The conveyance system further includes an energy harvesting device (32) and a switching arrangement (34). The switching arrangement (34) is arranged between the energy harvesting device (32) and the machine control circuit (24), and is switchable between a first condition, in which the energy harvesting device (32) is disconnected from the machine control circuit (24), and a second condition in which the energy harvesting device (32) is operatively connected to at least one switching device of the second plurality of switching devices (23) of the machine control circuit (24).

14 Claims, 8 Drawing Sheets

(51) Int. Cl.
*B66B 1/30* (2006.01)
*H02P 3/14* (2006.01)

(58) Field of Classification Search
USPC .......................................................... 187/290
See application file for complete search history.

(56) References Cited

U.S. PATENT DOCUMENTS

| | | | | |
|---|---|---|---|---|
| 2011/0139550 | A1* | 6/2011 | Veronesi | B66B 1/302<br>187/290 |
| 2014/0008155 | A1* | 1/2014 | Rossignol | B66B 1/302<br>187/290 |
| 2014/0116810 | A1* | 5/2014 | Vrankovic | B66B 1/302<br>187/290 |
| 2019/0106002 | A1 | 4/2019 | Gtz et al. | |
| 2020/0131004 | A1 | 4/2020 | Pahlke | |
| 2023/0011977 | A1* | 1/2023 | Nguyen | H02P 25/18 |

OTHER PUBLICATIONS

Chinese Office Action for Application No. 202211452623.3, Issued May 21, 2026, 10 Pages.

* cited by examiner

CONVEYANCE SYSTEM WITH REGENERATIVE DRIVE

This application claims priority to European Patent Application No. 22190435.2, filed Aug. 15, 2022, and all the benefits accruing therefrom under 35 U.S.C. § 119, the contents of which in its entirety are herein incorporated by reference.

TECHNICAL FIELD

This disclosure relates to a conveyance system including a regenerative drive, and to a method of operating a regenerative drive of a conveyance system.

BACKGROUND

It is known to provide regenerative drives to convert mechanical energy of a machine (e.g., a rotary motor) and a connected load into electrical energy, which is returned to an electrical power source under braking conditions. Regenerative drives can be used in conveyance systems, such as elevator systems, during braking of an elevator car.

SUMMARY

According to a first aspect of this disclosure there is provided a conveyance system, comprising: an alternating current (AC) power source; a machine for moving a conveyance apparatus; a regenerative drive, wherein the machine is connected to the AC power source by the regenerative drive, the regenerative drive comprising: a direct current (DC) bus; a converter, comprising a first plurality of switching devices in selective communication with each phase of the AC power source and with the DC bus; and a machine control circuit, comprising a second plurality of switching devices in selective communication with each terminal of the machine and with the DC bus; the conveyance system further comprising: an energy harvesting device; and a switching arrangement, arranged between the energy harvesting device and the machine control circuit, wherein the switching arrangement is switchable between a first condition, in which the energy harvesting device is disconnected from the machine control circuit, and a second condition in which the energy harvesting device is operatively connected to at least one switching device of the second plurality of switching devices of the machine control circuit.

According to a second aspect of this disclosure there is provided a method of operating a regenerative drive of a conveyance system, the regenerative drive comprising a direct current (DC) bus, a converter comprising a first plurality of switching devices in selective communication with each phase of an AC power source and with the DC bus, and a machine control circuit comprising a second plurality of switching devices in selective communication with each terminal of a machine and with the DC bus, the method comprising: driving movement of the machine with power from the alternating current (AC) power source using the regenerative drive, wherein the machine is arranged to move a conveyance apparatus of the conveyance system; when motion of the machine is being braked, harvesting power from the machine using the regenerative drive; switching a switching arrangement from a first condition, in which an energy harvesting device is disconnected from the machine control circuit of the regenerative drive, to a second condition in which the energy harvesting device is operatively connected to at least one switching device of the second plurality of switching devices of the machine control circuit.

According to a third aspect of the present disclosure there is provided a software product which, when implemented on a controller of a conveyance system, causes the controller to carry out the method as referred to above, and as explained in greater detail below.

Aspects of the present disclosure relate to operating a regenerative drive of a conveyance system in combination with an energy harvesting device, such as a solar panel or wind turbine, which allows energy to be extracted from the external environment as well.

By providing an energy harvesting device which can be switched between a first condition, disconnected from the machine control circuit of a regenerative drive, and a second connection in which it is connected to the machine control circuit, it is possible to selectively connect the energy harvesting device to the regenerative drive, and thereby to selectively use circuitry (i.e., the second plurality of switching devices of the machine control circuit) from the regenerative drive for the purpose of drawing power from the energy harvesting device. The machine control circuit helps to allow control of the energy being harvested from the energy harvesting device. This avoids the need to provide an entirely separate set of circuitry for the purpose of drawing power from the energy harvesting device. This can improve the energy efficiency of the conveyance system and could reduce the cost of the conveyance system, since fewer components are required than if separate circuitry is provided to the energy harvesting device.

The machine control circuit may be a bi-directional machine control circuit. It may be a full-bridge circuit.

In some examples, the machine may be an alternating current (AC) machine, e.g. an AC motor. The machine control circuit may be an inverter (e.g., a three-phase full bridge circuit). The energy harvesting device may be operatively connected to at least one phase of the inverter of the regenerative drive. The second plurality of switching devices may be in selective communication with each phase of the machine. By being in selective communication with each phase of the machine, the energy harvesting device may thereby be in selective communication with each terminal of the machine, since each terminal may correspond to a phase of the machine.

Thus, according to a fourth aspect, there is provided a conveyance system, comprising: an alternating current (AC) power source; a machine for moving a conveyance apparatus; a regenerative drive, wherein the machine is connected to the AC power source by the regenerative drive, the regenerative drive comprising: a direct current (DC) bus; a converter, comprising a first plurality of switching devices in selective communication with each phase of the AC power source and with the DC bus; and an inverter, comprising a second plurality of switching devices in selective communication with each phase of the machine and with the DC bus; the conveyance system further comprising: an energy harvesting device; and a switching arrangement, arranged between the energy harvesting device and the inverter, wherein the switching arrangement is switchable between a first condition, in which the energy harvesting device is disconnected from the inverter, and a second condition in which the energy harvesting device is operatively connected to at least one phase of the inverter.

Alternatively, in some other examples, the machine may be a direct current (DC) machine, e.g. a DC motor. The machine control circuit may be a DC drive, e.g., a single-phase full bridge circuit.

In some examples, the switching arrangement is arranged between a positive pole of the energy harvesting device and the machine control circuit. In some examples, the switching arrangement is a first switching arrangement and the conveyance system further comprises a second switching arrangement, wherein the second switching arrangement is arranged between the energy harvesting device and the DC bus. The second switching arrangement may be arranged between a negative pole of the energy harvesting device and the DC bus. The first switching arrangement and the second switching arrangement may be controlled to switch together.

In some examples, the conveyance system further comprises a switching controller. The switching controller may be arranged to control the switching arrangement (optionally both the first switching arrangement and the second switching arrangement) to switch between the first condition and the second condition. In other words, the switching controller may be responsible for connecting and disconnecting the energy harvesting device from the regenerative drive circuitry. It will therefore be understood that in some examples of the method referred to above, the method step of switching the switching arrangement from the first condition to the second condition may be carried out by a switching controller.

In some examples, the switching controller is arranged to switch the switching arrangement to the second condition when the machine is stationary. Similarly, the method step of switching the switching arrangement from the first condition to the second condition may be carried out when the machine is stationary. It will be understood that when the machine is stationary it is not acting to move a load (i.e., the conveyance apparatus). This may mean that the conveyance apparatus of the conveyance system is stationary, or may mean that it is being moved by other means. When the machine is stationary the regenerative drive is not being used either to supply power or to harvest power from the machine, and it is therefore available to be used to draw power from the energy harvesting device, without interfering with movement of the conveyance apparatus.

The switching controller may be arranged to switch the switching arrangement to the second condition whenever the machine is stationary (i.e., for any length of time whatsoever), but it may be preferable that the switching arrangement is only switched to the second condition (with the energy harvesting device connected) when the conditions of the conveyance system are such that the machine is known, expected, or likely to be stationary for a reasonable period of time (e.g., more than a threshold amount). This can be achieved in a number of ways.

In some examples the switching controller is arranged to switch the switching arrangement to the second condition when the machine has finished a conveying operation. Thus if the conveyance system is an elevator system, the switching arrangement may switch when an elevator car run comes to an end (i.e., when the last passenger leaves the elevator car, the doors have been closed, and there are no outstanding calls waiting to be served by that elevator car), since then the machine moving that elevator car has finished that conveying operation (and since the doors are closed no releveling operation, which also uses the machine control circuit, can be in progress). The switching controller may be arranged to switch the switching arrangement to the second condition when the conveyance apparatus moved by the machine has no outstanding run commands (i.e., at that time there is no further known demand for that conveyance apparatus, for example an elevator car that has no calls). In some examples, the switching controller is arranged to switch the switching arrangement to the second condition when the conveyance apparatus of the conveyance system (or the whole conveyance system) has moved into an idle mode of operation. Similarly, the method may comprise switching the switching arrangement to the second condition when one or more of these conditions holds.

The switching controller may also be arranged to switch the switching arrangement to the second condition even where further movement of the machine is already planned/expected. Thus in some examples, in addition, or alternatively to those mentioned above, the switching controller is arranged to switch the switching arrangement to the second condition when an expected stationary time of the machine is known, provided that the expected stationary time is above a threshold amount of time. Thus some power can still be drawn from the energy harvesting device, even when it is known that the machine is going to move again soon (e.g., to obey a further run command) provided that the length of stop that is anticipated is sufficiently long to make the switching worthwhile. Similarly, the method may comprise switching the switching arrangement when an expected stationary time of the machine is known, provided that the expected stationary time is above a threshold amount of time.

Alternatively, the switching controller may have no access to, or knowledge of, the anticipated movement of the machine. In this case the switching controller may instead base its switching on a detected current idle time of the machine. Thus, in some examples, the switching controller is arranged to switch the switching arrangement to the second condition once the machine has been stationary for more than a threshold amount of time. The threshold amount of time may be long enough to account for a standard stationary time of the conveyance apparatus, e.g., for the opening of elevator car doors, such that once this threshold amount of time is exceeded it can be assumed that the conveyance apparatus has no outstanding commands and is idling, and that therefore the machine will remain stationary for the time being. This allows operation of the switching arrangement to be achieved even without knowledge of the expected action of the conveyance apparatus and therefore of the machine. Similarly, the method may further comprise detecting a stationary time of the machine, and, once the machine has been stationary for more than a threshold amount of time, switching the switching arrangement to the second condition.

The conveyance system may further comprise a main conveyance system controller. It will be understood that the main conveyance system controller is the controller which manages operation of the overall conveyance system, and ensures the system responds to travel commands.

The conveyance system may further comprise a drive controller, wherein the drive controller is arranged to control switching of the first plurality of switching devices and the second plurality of switching devices so as to control the machine.

In some examples the switching controller is an independent controller, arranged to receive a signal e.g., from the main conveyance system controller or the drive controller, indicating when the conveyance system will be stationary.

In other examples the main conveyance system controller comprises the switching controller (i.e., the main conveyance system controller provides the switching controller). In further other examples the drive controller comprises the switching controller (i.e., the switching controller may be comprised in the drive controller, or in other words the drive controller provides the switching controller).

It will be understood that the (e.g., first) switching arrangement may be directly connected between the machine control circuit and the energy harvesting device, or that there may be other intermediate components present. For example, the switching arrangement may be connected between the machine and the energy harvesting device. As described above, the machine is connected to the machine control circuit, and therefore this arrangement results in the energy harvesting device being connectable to the machine control circuit.

In some examples, wherein the machine is an AC machine (i.e., comprising a plurality of phases) and the machine control circuit is an inverter, the machine comprises a star point, at which all phases of the machine meet, wherein the star point is arranged to be accessible from an exterior of the machine, and wherein the switching arrangement is connected to the star point. Arranging the star point so as to be accessible from an exterior of the machine allows the energy harvesting device to be connected to the machine in a convenient manner, and can make it easier to connect the energy harvesting device to the machine after installation of the machine, or to swap out the energy harvesting device after initial installation. Connecting the energy harvesting device to the inverter via the machine is particularly beneficial since the machine already comprises inductors, which help to control the current flowing from the energy harvesting device, and therefore there is no benefit in providing additional inductors for the energy harvesting device.

In other examples, the switching arrangement is connected between one phase (i.e., a first phase) of the machine control circuit and the energy harvesting device. This can improve the ease of installation and avoids the need to wire the energy harvesting device to the star point of the machine. It will be understood that this arrangement is not limited to the case where the machine control circuit is an inverter, but may be the case also where the machine control circuit is a DC drive.

In some examples, the conveyance system further comprises at least one machine switch, arranged to selectively connect a different phase (i.e., a second phase, one of the phases other than the phase that the switching arrangement is connected to) of the machine control circuit with a terminal of the machine. This first switch can remain closed when the machine is otherwise disconnected (i.e., other terminals or phases of the machine are disconnected from the machine control circuit), and the energy harvesting device connected to the machine control circuit by switching the switching arrangement to the second position, so that one or more inductors of the machine are connected in series with the energy harvesting device. This arrangement therefore utilizes existing inductors of the machine to control current flowing from the energy harvesting device. This avoids the need to provide additional inductors to the switching arrangement, although it does require switches that are arranged between the machine control circuit and the machine to be individually controllable, which is not standard for known arrangements. In other examples, the conveyance system further comprises an inductor, connected in series with the (first) switching arrangement, i.e., the inductor is connected in series with the switching arrangement that is arranged between the energy harvesting device and the machine control circuit. This helps to control the flow of current from the energy harvesting device.

Whilst there could just be one switching arrangement, connected between a single phase of the machine control circuit and the energy harvesting device, where the machine has a plurality of phases (i.e., is an AC machine) and the machine control circuit is an inverter, it can be beneficial to provide more than one switching arrangement, particularly where a large current is drawn from the energy harvesting device. In some examples, the conveyance system further comprises a second switching arrangement, wherein the second switching arrangement is connected between a second phase of the inverter and the energy harvesting device. It will be understood that where a second switching arrangement is arranged between the energy harvesting device and the DC bus, as described above, the switching arrangement referred to herein, between a second phase of the inverter and the energy harvesting device may be a third switching arrangement. The conveyance system may further comprise a second inductor, connected in series with the second switching arrangement.

It may be further beneficial that there is one switching arrangement provided per phase of the inverter. Thus, in some examples, the conveyance system further comprises at least one additional switching arrangement, such that there is one switching arrangement corresponding to each phase of the inverter, wherein each switching arrangement is connected between a respective phase of the inverter and the energy harvesting device. The conveyance system may further comprise at least one additional inductor, such that there is one inductor connected in series with each switching arrangement.

In some examples the switching arrangement is a mechanical switch or an electromechanical switch, e.g., a magnetic contact. Such switches would enable switching between the first condition and the second condition in as little as a few 100 ms. It may then be possible to reach the maximum power point of the energy harvesting device in a few ms. Therefore, the maximum available power could be drawn from the energy harvesting device in less than 1 second after the switching arrangement begins the switching process.

In some examples, the conveyance system further comprises a battery connected to the DC bus. It will be understood that the battery is therefore arranged to store energy that has been harvested from the energy harvesting device, and passed through the machine control circuit. In some examples, the battery is also arranged to store energy that is re-generated from the machine during braking of motion of the machine. The provision of a battery allows the harvested and/or re-generated energy to be stored for use at a convenient later time, for example in the event of a failure of the AC power supply.

Similarly, in some examples, the method further comprises: transferring power harvested from the energy harvesting device (e.g., when the machine is stationary) to the AC power source, through the converter; and/or transferring power harvested from the energy harvesting device (e.g., when the machine is stationary) to a battery connected to the DC bus.

In some examples, the method further comprises: returning power re-generated by motion of the machine being braked to the AC power source, through the converter; and/or returning power re-generated by motion of the machine being braked to a battery connected to the DC bus.

In some examples, the conveyance system further comprises a voltage measurement device, connected to the energy harvesting device and arranged to measure the voltage produced by the energy harvesting device. Measuring the voltage produced by the energy harvesting device allows maximum power point tracking to be used in order to harvest a greater amount of power from the energy harvesting device. Similarly, in some examples, the method further comprises measuring, using a voltage measurement device connected to the energy harvesting device, the voltage produced by the energy harvesting device.

The conveyance system may be a passenger conveyance system. In some examples, the conveyance system is an elevator system. In this case, the conveyance apparatus is an elevator car. In other examples, the conveyance system may be an escalator, moving walkway, or trolley. In such examples, the conveyance apparatus may be a moving belt or steps.

The machine can be a motor, e.g., a linear induction motor, which may be arranged to directly convey the conveyance apparatus. It may be a DC motor (i.e., having two terminals, or it may be an AC motor (i.e., having three terminals). Alternatively, in some examples, the machine is a rotary motor. The conveyance system may comprise tension members, wherein the tension members are connected between the machine and the conveyance apparatus. The machine may be arranged to drive the tension members.

The conveyance apparatus may be installed within a building. Thus, according to a fourth aspect of this disclosure, there is provided a building, comprising the conveyance system as described herein above and below, wherein the building is a residential building, or an office building, or a commercial building.

It will be understood that the energy harvesting device is a device that is capable of harvesting energy from the external environment, i.e., it is an environmental energy harvesting device. Thus it will be understood that a machine connected to a regenerative drive is not an energy harvesting device, even though energy can be returned from the machine, since the energy obtained by regeneration is not harvested from the external environment. The energy harvesting device may be a photovoltaic cell (e.g., a solar panel), a wind harvesting device (e.g., a wind turbine), a tidal power harvesting device, a thermal power harvesting device, or any other suitable device capable of harvesting power from the external environment. In some examples the energy harvesting device produces DC current.

It will be understood that any of the features described herein above with reference to the conveyance system may apply equally to the method described above, and vice versa.

DRAWING DESCRIPTION

Certain preferred examples of this disclosure will now be described, by way of example only, with reference to the accompanying drawings, in which.

DETAILED DESCRIPTION

Figure 1:
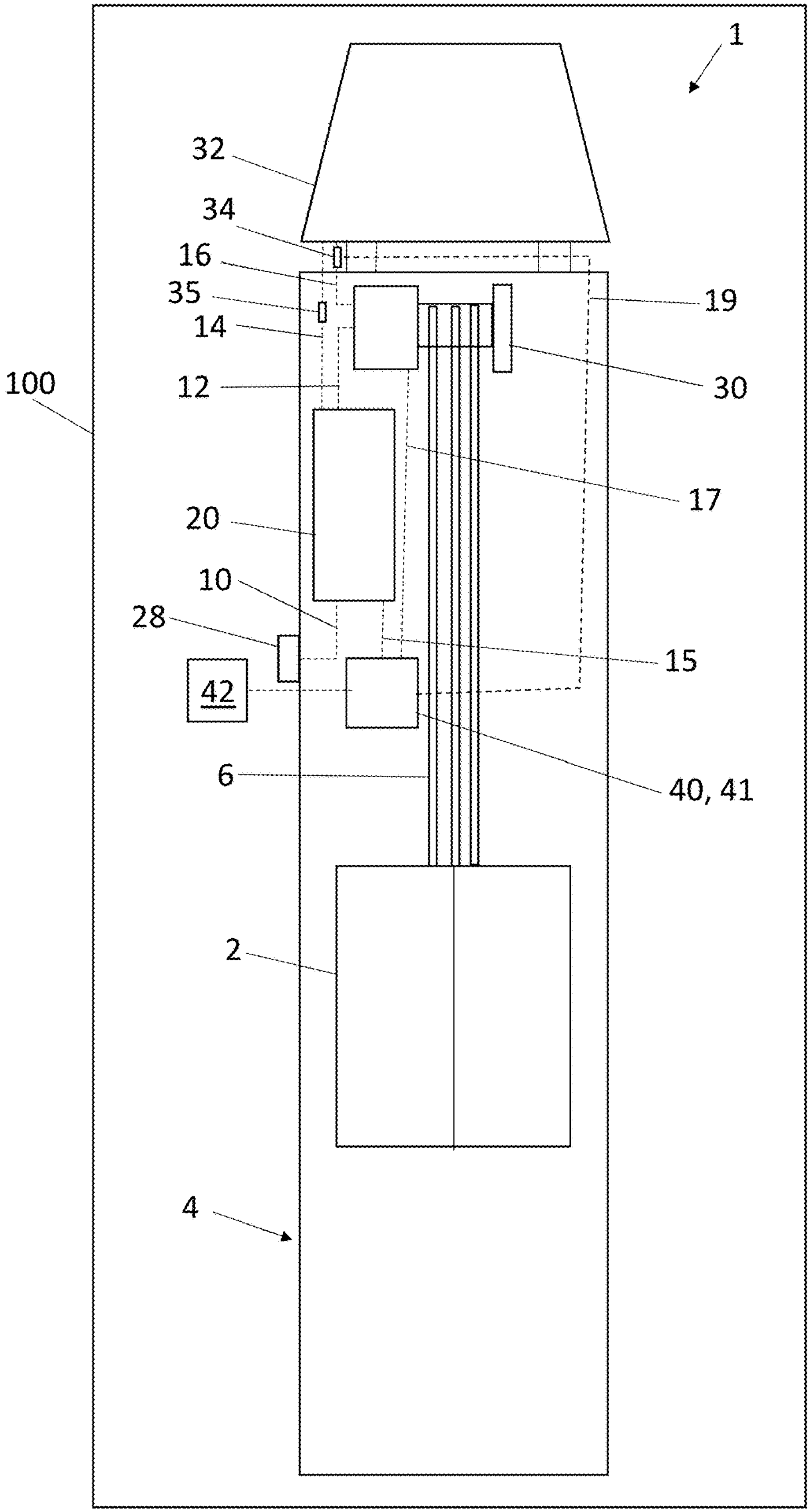
FIG. 1 is a schematic drawing showing a building containing a conveyance system according to a first example of a first aspect of the present disclosure.

FIG. 1 is a schematic diagram showing a conveyance system 1 according to an example of the present disclosure. The conveyance system 1 is located within a building 100. In this particular example the conveyance system 1 is an elevator system. The conveyance system 1 includes a conveyance apparatus 2, which in this example is an elevator car configured to travel upwards and downwards in a hoistway 4, moved by tension members 6, which may be, for example, belts or ropes. The tension members 6 are moved by a machine 30, under the control of a regenerative drive 20, discussed in greater detail below with reference to FIG. 2. The regenerative drive 20 and the machine 30 are controlled by a drive controller 41, which receives signals from the main conveyance system controller 42. The signals from the main conveyance system controller 42 indicate how the conveyance system should be operated, e.g., they provide a car call to respond to. The regenerative drive 20 is operable as a machine drive and a regenerative drive capable of harvesting regenerative energy from the machine 30 during braking of a load being driven, which in this case is the conveyance apparatus 2.

The regenerative drive 20 receives power from a mains AC power source 28, through the wiring 10. It is then wired to the machine 30 by machine wiring 12. The regenerative drive 20 is also connected to an energy harvesting device 32 by wiring 14. In this example the energy harvesting device 32 is a solar panel, comprising a plurality of photovoltaic cells. The energy harvesting device 32 is connected to the machine 30 by wiring 16. The drive controller 41 is connected to both the regenerative drive 20, by wiring 15, and to the machine 30, by wiring 17. The drive controller 41 is also connected to switching arrangements 34, 35 via wiring 19. A first switching arrangement 34 is arranged between the machine 30 and the energy harvesting device 32. This arrangement is described in greater detail below with reference to FIG. 2.

Figure 2:
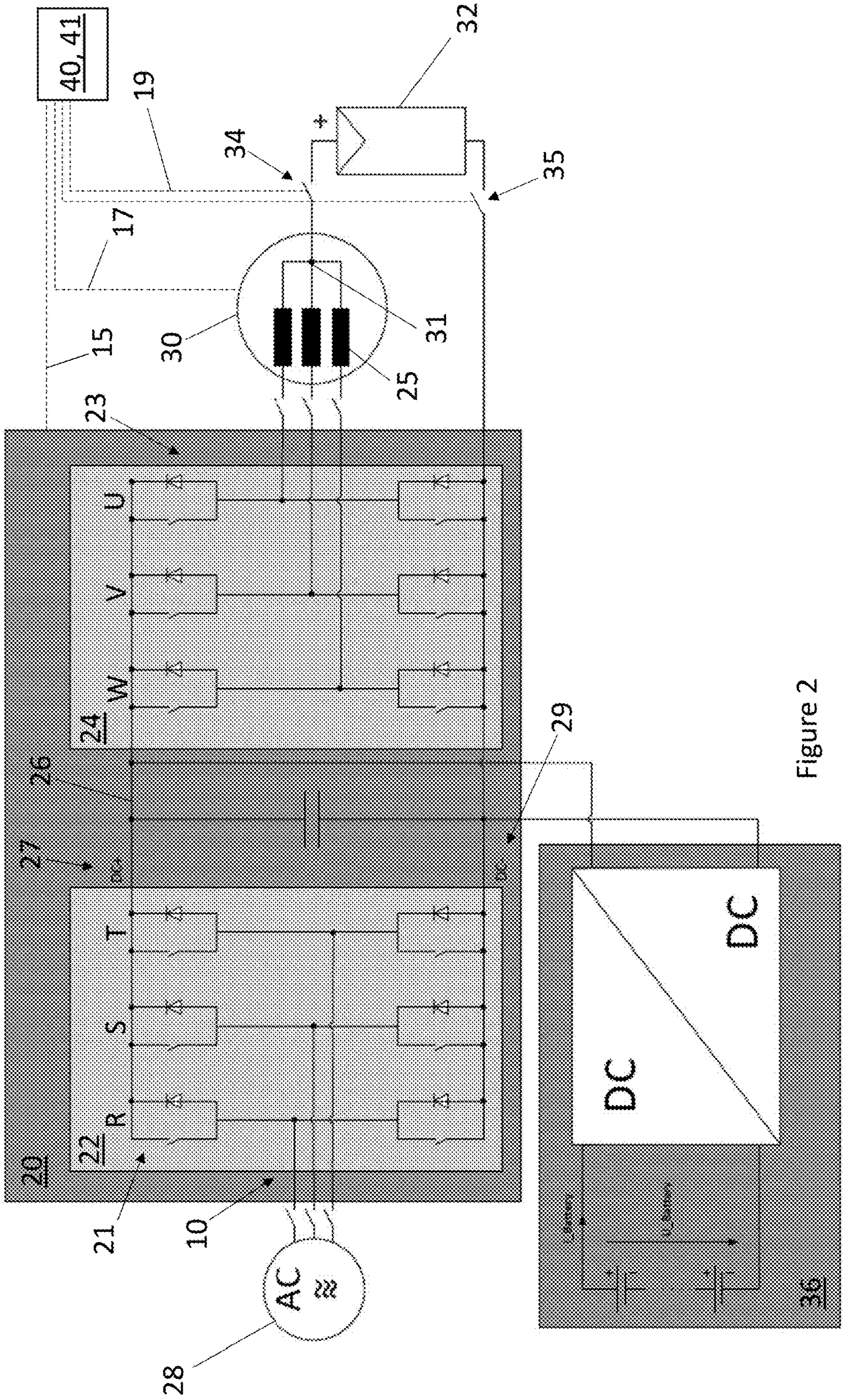
FIG. 2 is a schematic drawing showing the regenerative drive of FIG. 1 and its associated components in greater detail.

FIG. 2 is a schematic diagram, showing the regenerative drive 20 of FIG. 1 and its associated components in greater detail for a first example. The AC power source 28 can be, for example, an electrical main line. In the example of FIG. 2 the regenerative drive system 20 is a regenerative drive that includes a converter 22 having 3 phase legs, R, S, and T. Each phase leg, R, S, and T, includes switching devices 21 controlled by control signals from a drive controller 41 (i.e., through wiring 15) to convert AC power to DC power on a DC bus 26 having a high side 27 and a low side 29. The regenerative drive system 20 also includes a machine control circuit, which in this example is an inverter 24 having 3 phase legs, W, V, and U. Each phase leg, W, V, and U, includes switching devices 23 controlled by control signals from the drive controller 41 to convert DC power across the DC bus 26 to AC drive signals to power the machine 30. By controlling the switching of the switching devices 21, 23 (and therefore the voltage supplied to the machine 30) the drive controller 41 controls operation of the machine 30, i.e., whether the machine is driven to rotate or not. The drive controller 41 can also control operation of a machine brake (not shown) (i.e., via wiring 17) connected to the machine 30, which can brake motion of the machine 30. The drive controller 41 may be implemented using a general-purpose microprocessor executing a computer program stored on a storage medium to perform the operations described herein. Alternatively, the drive controller 41 may be implemented in hardware (e.g., ASIC, FPGA) or in a combination of hardware/software.

The energy harvesting device 32 (in this example a solar panel) is selectively connectable to the inverter 24 by operation of the first switching arrangement 34 and the second switching arrangement 35. The second switching arrangement 35 is arranged between a negative pole of the energy harvesting device 32, and the low side 29 of the DC bus 26. The drive controller 41 in this example also provides a switching controller 40, that controls the first switching arrangement 34 and the second switching arrangement 35. In particular, the switching controller 40 sends signals to the switching arrangements 34, 35 (e.g., via wiring 19) to control the switching arrangements 34, 35 to switch between a first condition (as shown in FIG. 2), in which the energy harvesting device 32 is disconnected from the inverter 24, and a second condition (not shown) in which the energy harvesting device 32 is operatively connected to the inverter 24. In particular, the energy harvesting device 32 is connected to the inverter 24 via the machine 30, and in particular it is connected to the star point 31 of the winding. The star point 31 is the position at which all three windings of the machine 30 meet, and at which the current is therefore the sum of the current on the three windings.

As stated above, in this example, the switching controller 40 is provided by the drive controller 41. The drive controller 41 also controls operation of the machine 30 and the regenerative drive 20, as described above, and therefore it has knowledge of the planned movement of the machine 30. The switching controller 40 can therefore control the switching arrangements 34, 35 to connect the energy harvesting device 32 to the inverter 24 when the machine 30 is stationary, since when the machine 30 is stationary the inverter 24 of the regenerative drive 20 is not in use for either powering or receiving power from the machine 30. As described above, the switching controller 40 may control the switching arrangements 34, 35 to switch only when the time in the second condition will be (or is predicted to be) sufficiently long to make the switching process worthwhile.

When the energy harvesting device 32 is not connected to the inverter (i.e., when the switching arrangement 34 is in the first condition) there is no current flow from the energy harvesting device 32 and therefore no power generation. The energy harvesting device 32 will simply generate an open-circuit voltage at its output clamps.

When the switching arrangements 34, 35 are switched into the second (closed) condition, and the energy harvesting device 32 connected to the inverter 24, harvested power from the energy harvesting device 32 can be sent to the AC power source 28 (e.g., to the mains grid) through the converter 22, or alternatively can be sent to a battery 36, which is connected to the DC link 26. The machine 30 includes inductors 25 connected on each phase of the machine 30. These act to control the current as current flows back from the energy harvesting device 32 to the DC link 26. Supplying the power back to the DC link 26 in this way also enables it to then easily be passed through the converter 22 to be returned to the AC power source 28, if required.

Figure 3:
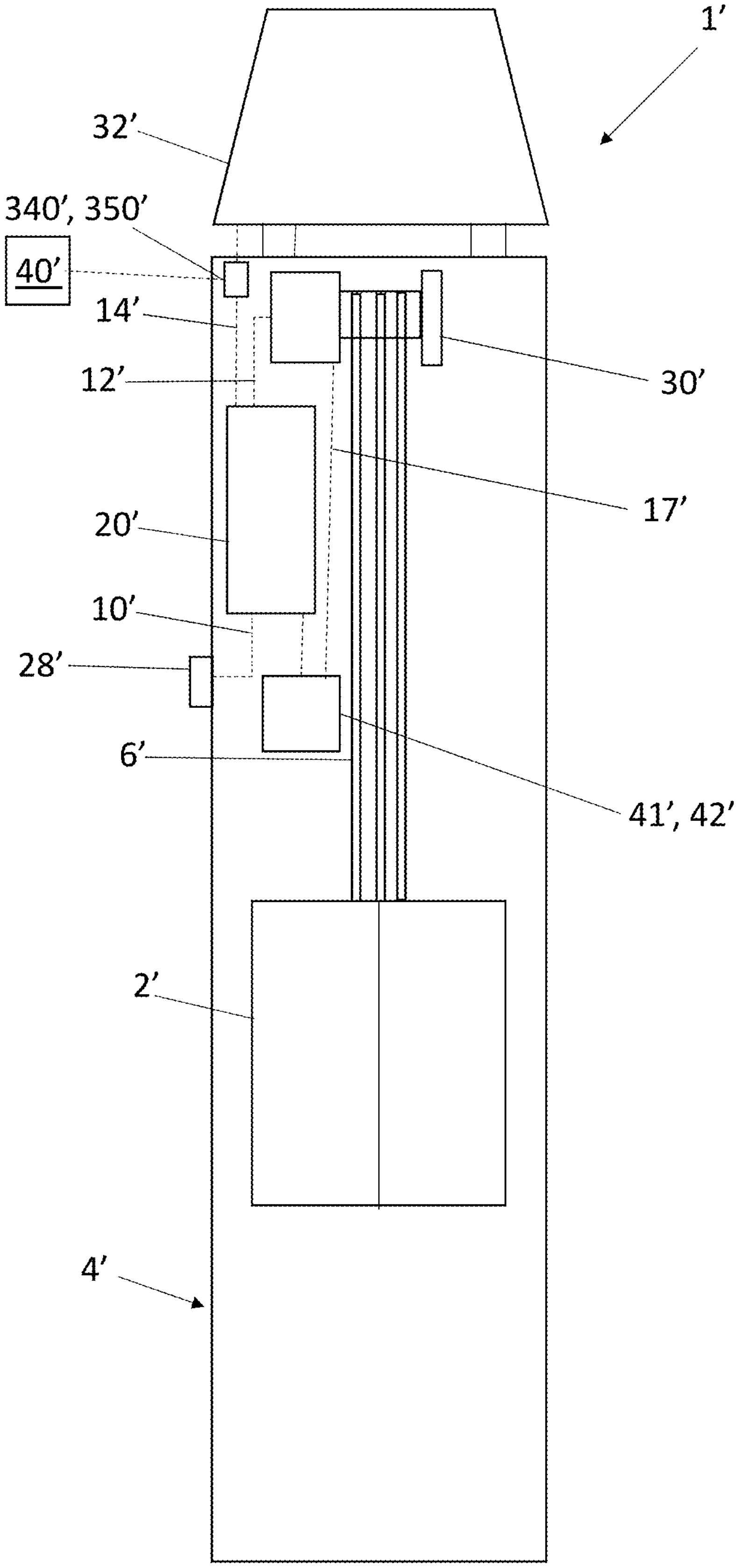
FIG. 3 is a schematic drawing showing a conveyance system according to a second example of the first aspect of the present disclosure.
Figure 4:
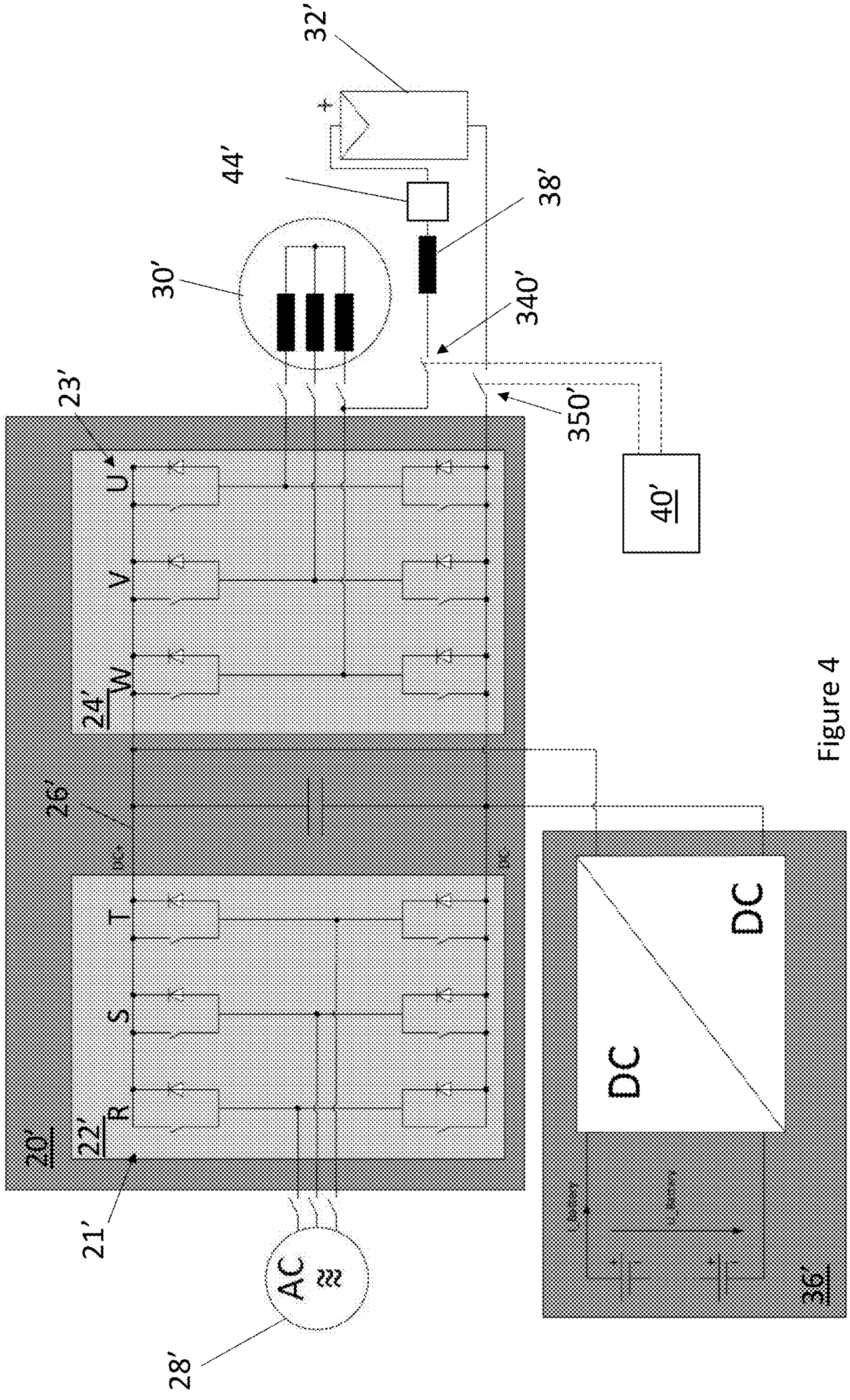
FIG. 4 is a schematic drawing showing the regenerative drive of FIG. 3 and its associated components in greater detail.

FIG. 3 shows a conveyance apparatus 1' according to a second example of the present disclosure, and FIG. 4 shows certain components of that conveyance apparatus 1' in greater detail. This example is largely very similar to that of FIGS. 1 and 2. Like components are labelled with the same reference numeral, but followed by an apostrophe "'", and will not be described in detail again. Only those components differing from the example of FIGS. 1 and 2 will be described in detail.

In this second example, the main conveyance system controller 42' provides the drive controller 41' that controls the regenerative drive 20' and the machine 30'. A separate switching controller 40' controls the switching arrangements 340', 350', which are described in greater detail with reference to FIG. 4.

In contrast to the first example, in which the energy harvesting device is connected to the star point of the machine, in this second example, the energy harvesting device 32' is connected to the W phase of the inverter 24' (although it will be understood that any of the three phases W, V, U could be used). The switching arrangements 340', 350', under the control of switching controller 40', controls whether the energy harvesting device 32' is connected to the inverter 24', or disconnected, based on the condition of the switching arrangements 340', 350' (i.e., whether they are open or closed). The first switching arrangement 340' is located between the energy harvesting device 32' (specifically its positive pole) and the phase of the inverter 24' (i.e., in series between them). The second switching arrangement 350' is connected between the negative pole of the energy harvesting device 32' and the low side of the DC bus 26'. Also connected in series with the first switching arrangement is an inductor 38' and a voltage measurement device 44'. Measuring the voltage produced by the energy harvesting device 32' using the voltage measurement device 44' allows maximum power point tracking to be used in order to harvest the maximum available power from the energy harvesting device 32'.

Figure 5:
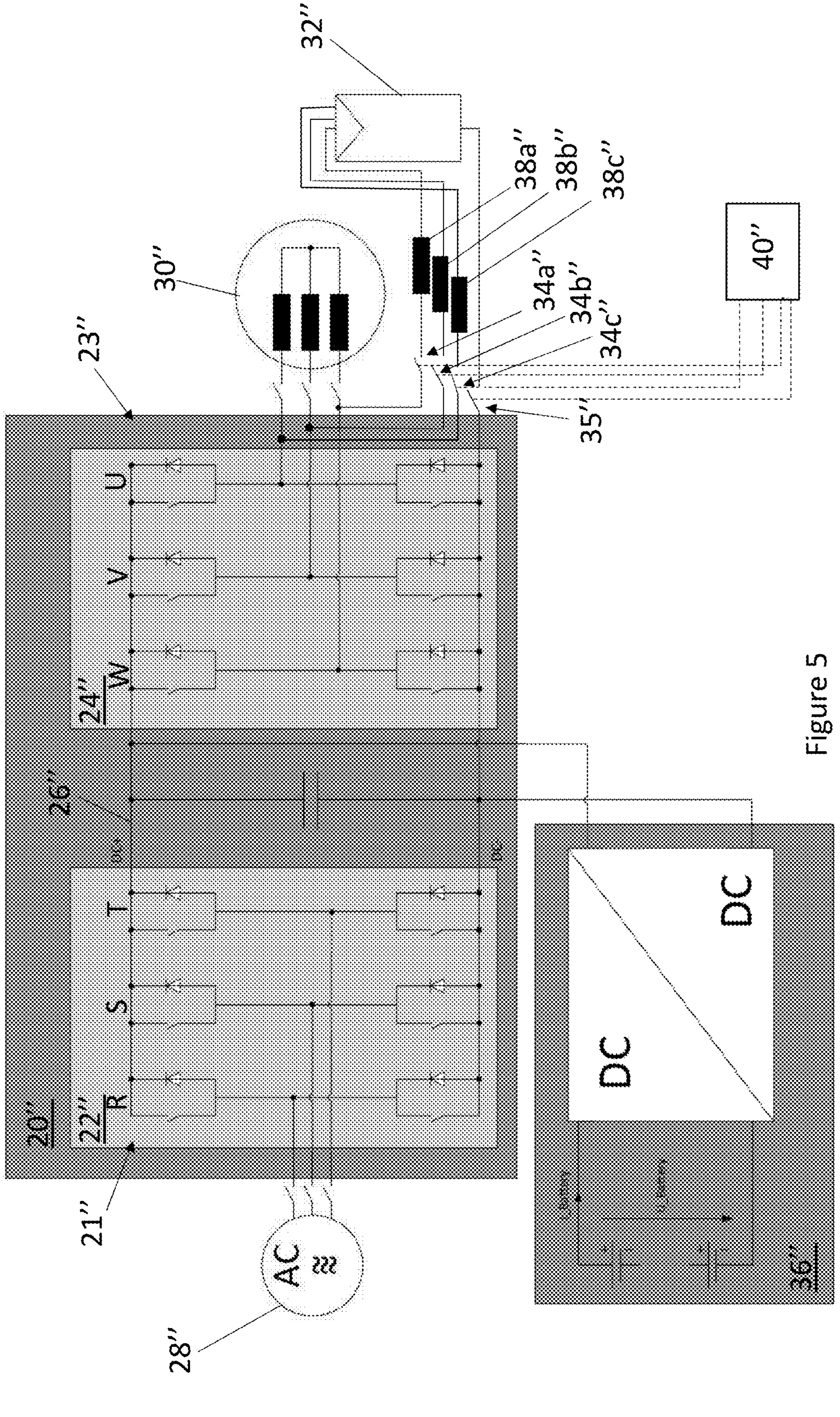
FIG. 5 is a schematic drawing showing a regenerative drive and its associated components according to a third example of a first aspect of the present disclosure.

The inductor 38' helps control the flow of current from the energy harvesting device. In some examples, particularly where a very large current is drawn from the energy harvesting device 32', it may be preferable that the energy harvesting device 32' is connected to more than one phase of the inverter 24', or even to every phase of the inverter 24'. Such an arrangement is illustrated in the third example, shown in FIG. 5. Many components are alike with those shown in FIG. 4, and will not be described in detail again. Like components are labelled with like reference numbers but followed by an additional apostrophe, compared to those used for the second example of FIGS. 3 and 4 (and therefore by two apostrophes compared to those used for the first example of FIGS. 1 and 2).

In this third example, instead of only one switching arrangement and inductor, as shown in FIG. 4, there is now one such arrangement for each phase of the inverter 24". Thus, the conveyance system includes a first switching arrangement **34*a*", connected between one phase of the inverter 24" (W) and the energy harvesting device 32". A first inductor 38*a*" is connected between the switching arrangement 34*a*" and the energy harvesting device 32", i.e., in series with them. The conveyance system further includes a second switching arrangement 34*b*", connected between one phase of the inverter 24" (V) and the energy harvesting device 32". A second inductor 38*b*" is connected between the switching arrangement 34*b*" and the energy harvesting device 32". The conveyance system also includes a third switching arrangement 34*c*", connected between one phase of the inverter 24" (U) and the energy harvesting device 32". A third inductor 38*c*" is connected between the switching arrangement 34*c*" and the energy harvesting device 32". A fourth switching arrangement 350' is connected between the negative pole of the energy harvesting device 32' and the low side of the DC bus 26'**.

Figure 6:
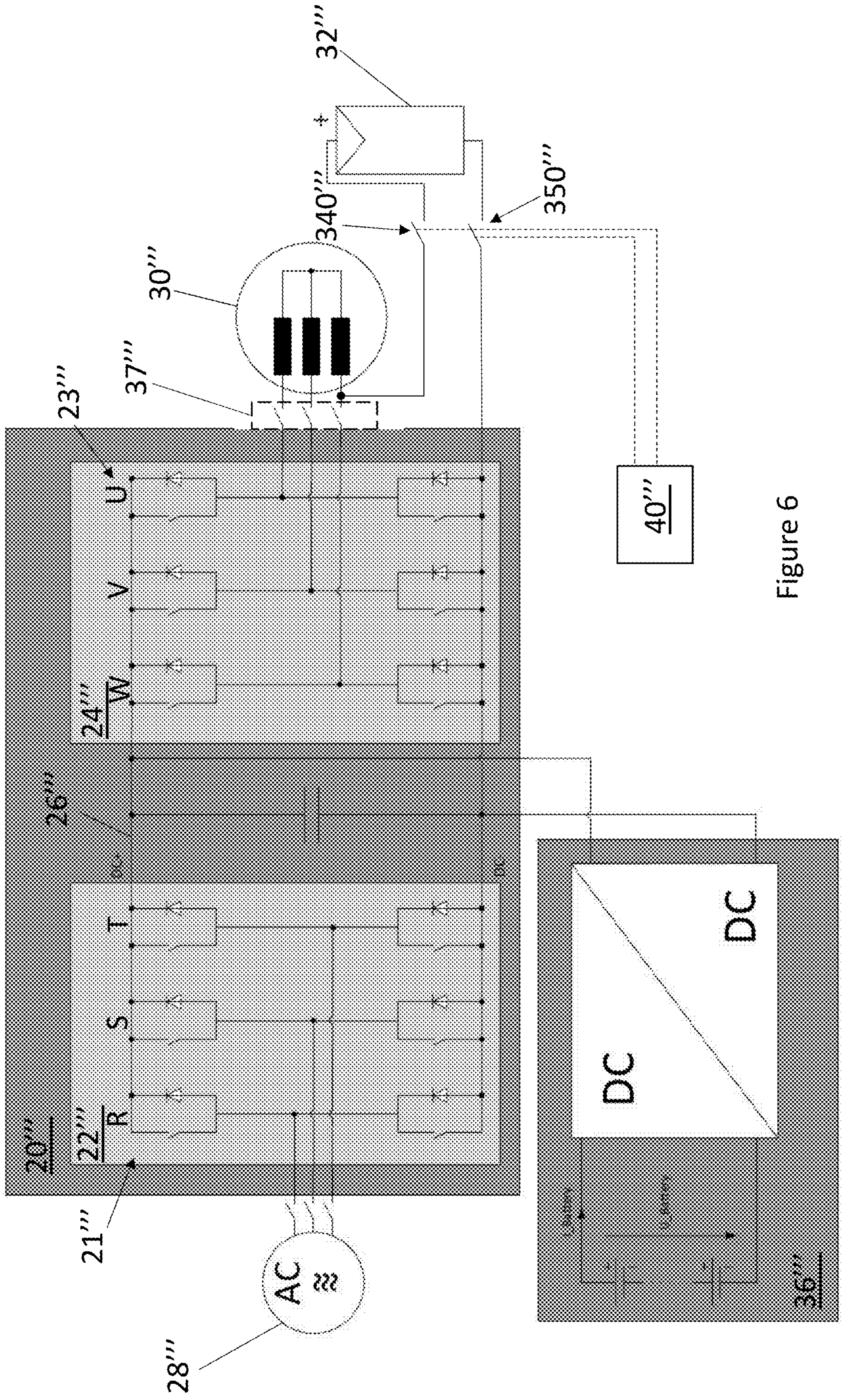
FIG. 6 is a schematic drawing showing a regenerative drive and its associated components according to a fourth example of a first aspect of the present disclosure.

FIG. 6 shows a fourth example. It is similar to that of FIGS. 4 and 5, since the positive pole of the energy harvesting device 32''' is connected directly to a phase (W) of the inverter 24''', but in this arrangement no additional inductors are needed. Many components are alike with those shown in the preceding Figures, and will not be described in detail again. Like components are labelled with like reference numbers but followed by an additional apostrophe, compared to those used for the third example of FIG. 5 (and therefore by two apostrophes compared to the second example of FIGS. 3 and 4 and by three apostrophes compared to those used for the first example of FIGS. 1 and 2).

In this example, the machine switches 37''' connecting the three phases of the machine 30''' to the three phases of the inverter 24''' are individually switchable (which is not standard in such an arrangement). As a result, the switch on one of the phases V, U that the switching arrangement 340''' is not connected to can be closed when the switching arrangements 340''', 350''' are closed. This causes two of the inductors of the machine 30''' to be connected in series with the energy harvesting device 32'''. In this arrangement the inverter phase connected to the closed switch of the machine switches 37''' (i.e., phase V or U), will be the only actively switching phase. This arrangement therefore allows the existing inductors of the machine 30''' to be re-used during energy harvesting, so that additional inductors are not required.

Figure 7:
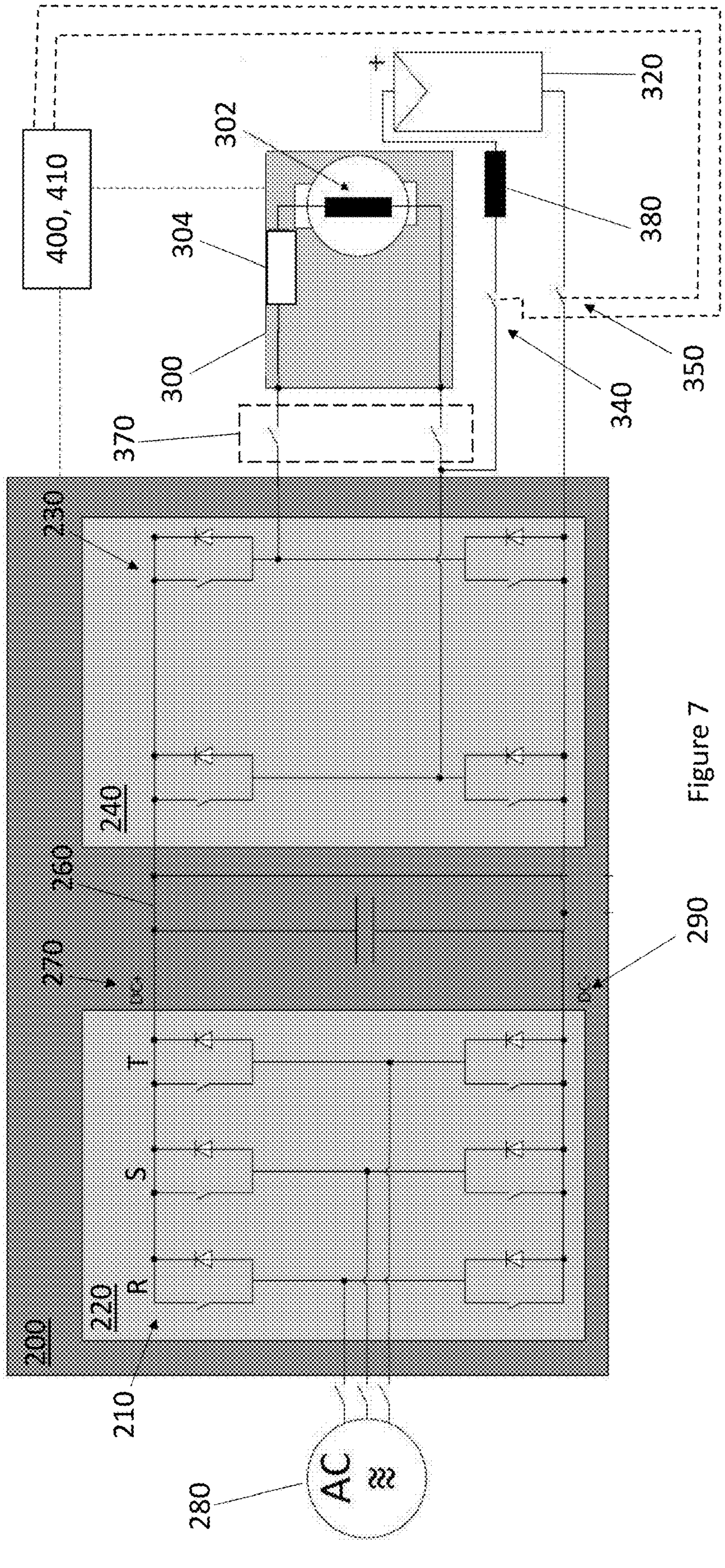
FIG. 7 is a schematic drawing showing a regenerative drive and its associated components according to a fifth example of a first aspect of the present disclosure.

FIG. 7 is a schematic diagram, showing a regenerative drive 200 and its associated components according to a fifth example of a first aspect of the present disclosure.

The regenerative drive 200 includes a converter 220 having 3 phase legs, R, S, and T. Each phase leg, R, S, and T, includes switching devices 210 controlled by control signals from a drive controller 410 to convert AC power supplied by an AC power source 280 to DC power on a DC bus 260 having a high side 270 and a low side 290. The AC power source 280 can be, for example, an electrical main line.

The regenerative drive system 200 also includes a machine control circuit, which in this example is a DC drive 240. The DC drive 240 includes a plurality of switching devices 230, that are arranged to alter the voltage supplied on the DC bus 260 to control the voltage supplied to a DC machine 300. The DC machine includes a stator winding 302 and a rotor winding 304. Although shown as being in series connection with the stator winding 302, a rotor winding 304 may additionally or alternatively be arranged in parallel with the stator winding 302.

Thus, by controlling the switching of the switching devices 210, 230 the drive controller 410 controls operation of the machine 300, i.e., whether the machine is driven to rotate or not. The drive controller 410 can also control operation of a machine brake (not shown) connected to the machine 300, which can brake motion of the machine 300.

The drive controller 410 may be implemented using a general-purpose microprocessor executing a computer program stored on a storage medium to perform the operations described herein. Alternatively, the drive controller 410 may be implemented in hardware (e.g., ASIC, FPGA) or in a combination of hardware/software.

An energy harvesting device 320 is connected to the DC drive 240 by a first switching arrangement 340, arranged between the positive pole of the energy harvesting device 320 and a set of the switching devices 230, and by a second switching arrangement 350, arranged between the negative pole of the energy harvesting device 320 and the low side 290 of the DC bus 260. Each set of the switching devices 230 (i.e., each vertical branch) can be considered as a phase of the DC drive 240. The energy harvesting device 320 (which in this example is a solar panel) is selectively connectable to the DC drive 240 by operation of the first switching arrangement 340 and the second switching arrangement 350. The drive controller 410 in this example also provides a switching controller 400, that controls the first switching arrangement and the second switching arrangement 350. In particular, the switching controller 400 sends signals to the switching arrangements 340, 350 to control the switching arrangements 340, 350 to switch between a first condition (as shown in FIG. 7), in which the energy harvesting device 320 is disconnected from the DC drive 240, and a second condition (not shown) in which the energy harvesting device 320 is operatively connected to the DC drive 240, allowing power from the energy harvesting device 320 to be transferred back through the DC drive 240, and the converter 220 to the AC power source 280.

In this example, an additional inductor 380 is provided, between the positive node of the energy harvesting device 320 and the set of switching devices. However, alternatively, no additional inductor need be provided where the machine switches 370 are individually controllable, following a similar principle to that described above with reference to FIG. 6.

Figure 8:
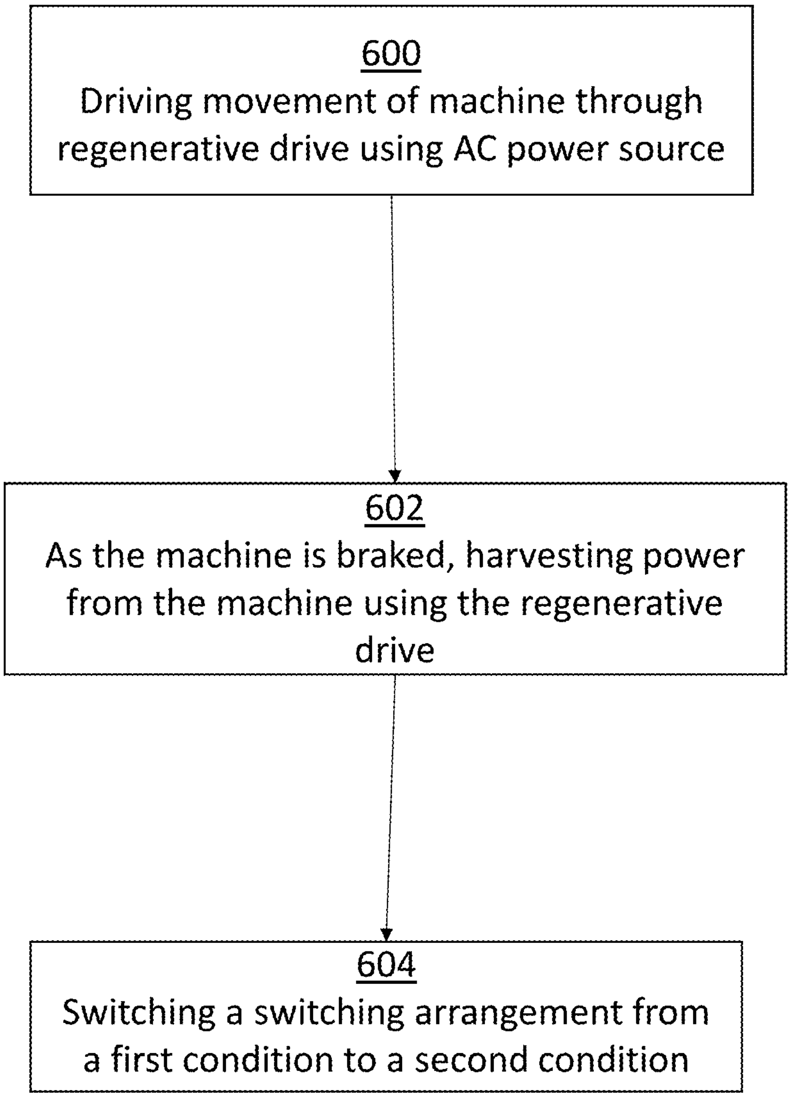
FIG. 8 is a flow diagram showing a method according to a second aspect of the present disclosure.

A method according to a second aspect of the present disclosure is illustrated in FIG. 8. In a first step, 600, movement of the machine of the conveyance system is driven using with power from the alternating current (AC) power source using the regenerative drive. Next, at step 602, power is harvested from the machine using the regenerative drive as the motion of the machine is being braked. Then, at step 604, a switching arrangement is switched from a first condition, in which an energy harvesting device is disconnected from the inverter of the regenerative drive, to a second condition in which the energy harvesting device is operatively connected to at least one phase of the inverter of the regenerative drive. Step 604 may take place when the machine is stationary.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. A conveyance system, comprising:

an alternating current (AC) power source;

a machine for moving a conveyance apparatus;

a regenerative drive, wherein the machine is connected to the AC power source by the regenerative drive, the regenerative drive comprising:

a direct current (DC) bus;

a converter, comprising a first plurality of switching devices in selective communication with each phase of the AC power source and with the DC bus; and a machine control circuit, comprising a second plurality of switching devices in selective communication with each phase of the machine and with the DC bus;

the conveyance system further comprising:

an energy harvesting device; and a switching arrangement, arranged between the energy harvesting device and the machine control circuit, wherein the switching arrangement is switchable between a first condition, in which the energy harvesting device is disconnected from the machine control circuit, and a second condition, in which the energy harvesting device is operatively connected to at least one switching device of the second plurality of switching devices of the machine control circuit;

wherein the switching arrangement is connected between one phase of the machine control circuit and the energy harvesting device.

2. The conveyance system of claim 1, further comprising a switching controller, arranged to control the switching arrangement to switch between the first condition and the second condition.

3. The conveyance system of claim 2, wherein the switching controller is arranged to switch the switching arrangement to the second condition when the machine is stationary.

4. The conveyance system of claim 2, comprising a drive controller arranged to control switching of the first plurality of switching devices and the second plurality of switching devices so as to control the machine, wherein the drive controller comprises the switching controller.

5. The conveyance system of claim 1, wherein the machine comprises a star point, at which all phases of the machine meet, wherein the star point is arranged to be accessible from an exterior of the machine, and wherein the switching arrangement is connected to the star point.

6. The conveyance system of claim 1, further comprising an inductor, connected in series with the switching arrangement.

7. The conveyance system of claim 1, wherein the machine control circuit is an inverter, and further comprising a second switching arrangement, wherein the second switching arrangement is connected between a second phase of the inverter and the energy harvesting device.

8. The conveyance system of claim 1, wherein the conveyance system further comprises at least one machine switch, arranged to selectively connect a different phase of the machine control circuit with a phase of the machine.

9. The conveyance system of claim 1, further comprising a voltage measurement device, connected to the energy harvesting device and arranged to measure the voltage produced by the energy harvesting device.

10. The conveyance system of claim 1, wherein the conveyance system is an elevator system.

11. A building, comprising the conveyance system of claim 1, wherein the building is a residential building, or an office building, or a commercial building.

12. A method of operating a regenerative drive of a conveyance system, the regenerative drive comprising a direct current (DC) bus, a converter comprising a first plurality of switching devices in selective communication with each phase of an alternating current (AC) power source and with the DC bus, and a machine control circuit comprising a second plurality of switching devices in selective communication with each phase of a machine and with the DC bus, the method comprising:

driving movement of the machine with power from the AC power source using the regenerative drive, wherein the machine is arranged to move a conveyance apparatus of the conveyance system;

when motion of the machine is being braked, harvesting power from the machine using the regenerative drive;

switching a switching arrangement from a first condition, in which an energy harvesting device is disconnected from the machine control circuit of the regenerative drive, to a second condition in which the energy harvesting device is operatively connected to at least one switching device of the second plurality of switching devices of the machine control circuit;

wherein the switching arrangement is connected between one phase of the machine control circuit and the energy harvesting device.

13. The method of claim 12, further comprising:

transferring power harvested from the energy harvesting device when the machine is stationary to the AC power source, through the converter; and/or transferring power harvested from the energy harvesting device when the machine is stationary to a battery connected to the DC bus.

14. A software product which, when implemented on a controller of a conveyance system, causes the controller to carry out the method as claimed in claim 12.

* * * * *